(12) United States Patent
Richter et al.

(10) Patent No.: US 11,723,757 B2
(45) Date of Patent: Aug. 15, 2023

(54) DENTAL MATERIAL DISPENSING DEVICE AND A METHOD OF DISPENSING A DENTAL MATERIAL

(71) Applicant: 3M INNOVATIVE PROPERTIES COMPANY, St. Paul, MN (US)

(72) Inventors: Christian A. Richter, Feldafing (DE); Anja Friedrich, Gilching (DE); Thomas Müller, Gauting (DE); Rudolf Schmid, Eichenau (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 296 days.

(21) Appl. No.: 16/948,388

(22) Filed: Sep. 16, 2020

(65) Prior Publication Data

US 2020/0405454 A1 Dec. 31, 2020

Related U.S. Application Data

(63) Continuation of application No. 15/571,956, filed as application No. PCT/US2016/033296 on May 19, 2016, now abandoned.

(30) Foreign Application Priority Data

May 29, 2015 (EP) .................................. 15169798

(51) Int. Cl.
*A61C 9/00* (2006.01)
*A61C 13/15* (2006.01)

(52) U.S. Cl.
CPC .......... *A61C 9/0026* (2013.01); *A61C 9/0033* (2013.01); *A61C 19/004* (2013.01)

(58) Field of Classification Search
CPC ... A61C 9/0026; A61C 9/0033; A61C 19/004; A61C 5/62; A61C 5/66; A61C 5/68; A61C 5/64
See application file for complete search history.

(56) References Cited

U.S. PATENT DOCUMENTS 3,212,685 A 10/1965 Richard
4,740,159 A * 4/1988 Hamilton ................. A61C 9/00
433/37

(Continued)

FOREIGN PATENT DOCUMENTS

EP 1090610 4/2001
EP 1349796 10/2003

(Continued)

*Primary Examiner* — Ralph A Lewis

(57) ABSTRACT

A dental material dispensing device has a plunger means which for dispensing the dental material is movable for urging at least one component of a dental material toward a dispensing area. The device further has cure control means with an energy source and a flow path on which the dental composition and/or the dental material flows past the energy source during dispensation. The device is operable for exposing the dental composition and/or the dental material to a specific energy by control of the energy source and/or by control of the speed of the flow of the dental composition and/or the dental material on the flow path. The device is configured for dispensing a coherent strand of dental material in a dispensing cycle. The device is further configured for operating in a first dispensing mode and additionally in a second dispensing mode during the same dispensing cycle. The ratio between the specific energy in the second dispensing mode and the specific energy in the first dispensing mode is smaller than 1.

20 Claims, 2 Drawing Sheets

(56) References Cited

U.S. PATENT DOCUMENTS

| | | | |
|---|---|---|---|
| D419,236 S | 1/2000 | Carlson | |
| 7,128,246 B2 | 10/2006 | Raia | |
| 9,883,931 B2 * | 2/2018 | Gente | A61C 1/0046 |
| 10,076,767 B2 * | 9/2018 | Offermann | B05C 17/005 |
| 2005/0186531 A1 * | 8/2005 | Friedman | A61C 5/62 |
| | | | 433/90 |
| 2006/0223027 A1 | 10/2006 | Smith | |
| 2008/0118887 A1 * | 5/2008 | Teufelberger | A61C 19/004 |
| | | | 433/29 |
| 2009/0191506 A1 * | 7/2009 | Clark | A61C 5/62 |
| | | | 433/41 |
| 2012/0101452 A1 | 4/2012 | Harms | |
| 2012/0160047 A1 | 6/2012 | Plumptre | |
| 2012/0244493 A1 | 9/2012 | Leiner | |
| 2013/0115568 A1 | 5/2013 | Jelovac | |
| 2015/0151138 A1 * | 6/2015 | Gualandi | A61C 19/004 |
| | | | 604/20 |
| 2018/0132979 A1 | 5/2018 | Richter | |

FOREIGN PATENT DOCUMENTS

| | | | |
|---|---|---|---|
| EP | 2560713 | 2/2013 | |
| WO | WO 2004-006796 | 1/2004 | |
| WO | WO 2006-108085 | 10/2006 | |
| WO | WO-2009148785 A1 * | 12/2009 | A61C 5/064 |
| WO | WO-2014044711 A1 * | 3/2014 | A61B 1/04 |
| WO | WO 2014-179219 | 11/2014 | |
| WO | WO 2015-130739 | 9/2015 | |

\* cited by examiner

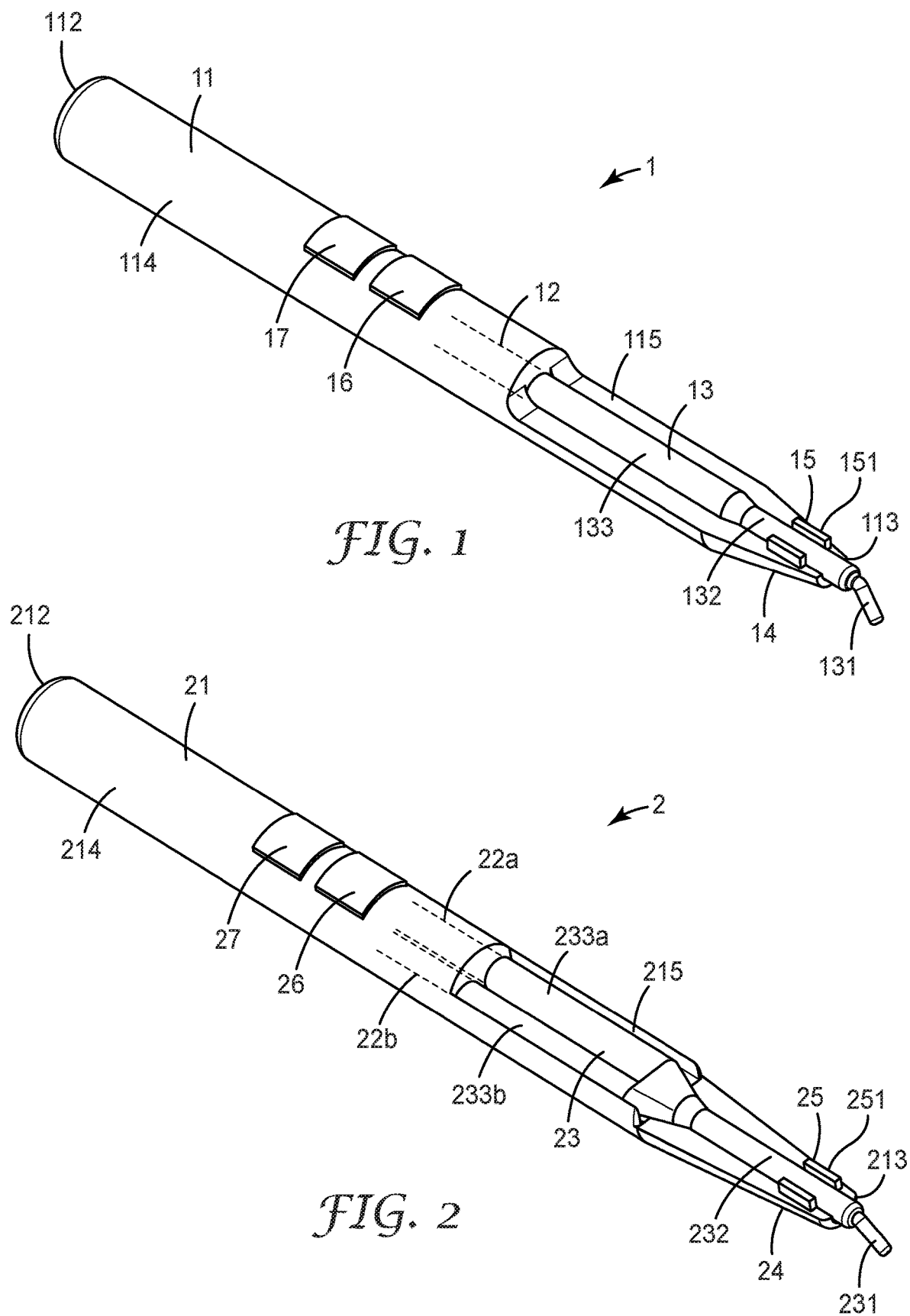

DENTAL MATERIAL DISPENSING DEVICE AND A METHOD OF DISPENSING A DENTAL MATERIAL

FIELD OF THE INVENTION

The invention relates to a dental material dispensing device for operating in a first dispensing mode and additionally in a second dispensing mode during the same dispensing cycle for user-selected dispensing of, for example, a dental retraction material or a dental impression material in a single strand of material.

BACKGROUND

The restoration of a patient's tooth or teeth often includes the replacement of natural tooth structure by a manufactured dental restoration or dental prosthesis. Typically a tooth that is to be restored is first prepared by a dentist, for example by grinding to remove undesired or diseased tooth substance, and to provide the tooth with a shape appropriate to receive the dental restoration.

The dental restoration is typically precisely mated with the remaining tooth shape prepared by the dentist, on the basis of an impression of the prepared tooth. Therefore the dental impression should be very precise and should represent all tooth structure required to determine the shape of the mating surface of the dental restoration to be attached. In particular, the dental impression should represent the transition or the "margin" between the shape prepared in a tooth and the natural tooth shape. For dental restorations that extend beneath a patient's gingiva (or gums) the dentist also should make the part of the margin that would normally be covered by the gingiva accessible for the dental impression. The procedure of displacing the gingiva from the tooth to make the margin accessible is also known as "gingival retraction" or "dental retraction" in the field of dentistry. A common dental retraction procedure includes the insertion of a so-called retraction cord in the gingival sulcus (opening) by use of an appropriate dental instrument, for example by a Heinemann spatula.

There are alternatives to a dental retraction cord. For example WO 2009/151983 A2 discloses a device for use in retracting a gingiva from a human tooth by widening a gingival sulcus with a dental composition. The device comprises a cannula with a free end having an opening for dispensing the dental composition. The free end is shaped to be inserted with its front in the entry of the gingival sulcus, and to laterally displace the gingiva from the tooth as the cannula is moved in the gingival sulcus.

Although solutions for dental retraction and dental impressioning exist there is still a need for an easy and inexpensive procedure in this field of dentistry.

SUMMARY OF THE INVENTION

The invention relates to a dental material dispensing device. The device comprises a plunger means. The plunger means for dispensing the dental material is movable for urging a dental composition from which the dental material is to be prepared toward a dispensing area. The device further has cure control means comprising an energy source, and a flow path on which the dental composition and/or the dental material flows past the energy source during dispensation. The device is operable for exposing the dental composition and/or the dental material to a specific energy by control of the energy source and/or by control of the speed of the flow of the dental composition and/or the dental material on the flow path. The specific energy is quantified by the energy intensity the dental composition and/or the dental material is exposed to relative to the flow speed of the flow of the dental composition and/or the dental material on the flow path. The device is configured for dispensing a coherent or contiguous strand of dental material. Further, the device is configured for operating in a first dispensing mode and, additionally, in a second dispensing mode during dispensation of the (coherent or contiguous) strand. The ratio between the specific energy in the second dispensing mode and the specific energy in the first dispensing mode is smaller than 1.

The ratio can be calculated by the specific power emitted from the energy source in the second dispensing mode divided by the specific power emitted from the energy source in the first dispensing mode. The specific power can be calculated by the absolute power emitted from the energy source divided by the flow speed of the dental composition and/or the dental material in the respective dispensing mode. Although the specific power emitted from the light source may be different from the specific energy the dental composition and/or the dental material is exposed to, the calculation of the ratio can be performed based on the specific power or the specific energy. This is because the difference between the specific energy and the specific power is based on physical factors which however do not change or do not essentially change between the first and second dispensing mode. For example if the specific power emitted from the energy source only partially acts on the dental composition and/or dental material due to geometric factors of the device, such factors are constant for both, the first and second dispensing mode, and therefore are not relevant in the calculation of the ratio.

The term "dental composition" refers to a raw or original material, for example as it is stored in the device or in a cartridge received in the device. Such a dental composition may be prepared by a manufacturer, for example a dental material manufacturer and/or a manufacturer of the cartridge. Alternatively, the dental composition may be prepared by a user of the device or the cartridge, for example just a short time prior to use. Accordingly, the dental composition may be configured so that the components from which it is prepared essentially do not chemically react with each other just from the combination of components, or alternatively the dental composition may be configured to polymerize from a chemical reaction of the components from which it is prepared. The first dental composition thus may essentially keep its initial properties for several month, while the latter dental composition may polymerize within several minutes.

The term "dental material" refers to a material which is ready to use, for example the material dispensed from the device. In case a light hardenable dental composition is used as original material that dental composition may be used unchanged so that the dental composition and the dental material are chemically identical but distinguished herein by the stage of preparation in the device. In case a two-component material is used two different dental compositions may be mixed to form the dental material. In this case each dental composition is chemically different from the dental material.

The ratio between the specific energy in the second dispensing mode and the specific energy in the first dispensing mode is preferably within a range of 0 to less than 1.

The invention is advantageous in that it enables a method of combined dental retraction and dental impressioning. In particular, the invention allows the same dental material to be used for dental retraction and dental impressioning by providing the material pre-polymerized at different degrees in the same strand of dispensed material. Accordingly the invention facilitates dental impressioning by including the dental retraction into the impressioning procedure. Thus, the invention helps saving time and efforts in the impressioning procedure.

In one embodiment the device is configured for dispensation of the strand in a continuous dispensing cycle. The first and second dispensing mode may particularly be selectively activatable during the same dispensing cycle. A dispensing cycle for the purpose of the present specification corresponds to the dispensation of one coherent strand of dental material. Each dispensing cycle may end upon cutting or otherwise separating the strand from the dispensing device.

In one embodiment the specific energy in the second dispensing mode is essentially zero. Accordingly, in the second dispensing mode the energy source may be switched off or deactivated (although the flow speed of the dental composition and/or the dental material is greater than zero).

In a preferred embodiment the energy source may be activated in the first and second dispensing mode, preferably operated to emit the same power in both modes. In this embodiment the flow speed in the second dispensing mode is higher than in the first dispensing mode. Due to the higher flow speed the specific energy in the second dispensing mode is lower than in the first dispensing mode, so that also the ratio between the specific energy in the second dispensing mode and the specific energy in the first dispensing mode is smaller than 1. This embodiment may be used, for example in combination with a light hardenable dental composition and/or dental material.

Exposing the dental composition and/or the dental material to energy preferably corresponds to supplying energy to the dental composition and/or the dental material. The energy may be particularly supplied by irradiation with electromagnetic waves, for example near ultraviolet (UV), visible or infrared light. Typically the energy to which the dental composition and/or the dental material is exposed to is only partially supplied to the dental composition and/or the dental material. For example, the dental material may absorb only a part of the energy while another part is reflected, not absorbed or otherwise lost.

In an embodiment of the invention the plunger means is movable by control of the device. The motion of the plunger means preferably causes dental composition to be urged toward the dispensing area.

The dispensing area is preferably formed in or by a front portion of the device. The front portion may particularly comprise or accommodate a dispensing nozzle from which the dental material can be dispensed. Further, the dispensing area may comprise the cure control means. In particular the cure control means may be arranged between an outlet of a cartridge and an inlet of the dispensing nozzle.

In one embodiment a part of the energy source of the cure control means may be located in a body of the device. The body may for example form a grip portion toward a rear end and the cure control means may be arranged adjacent a front end of the body. Part of the energy source may be arranged spaced apart from the cure control means, for example in the grip portion. In this embodiment the energy source may comprise means for guiding the energy. Such means may form an outlet for the energy in the cure control means. For example a part of a light source, like one or more LEDs, may be arranged within the grip portion of the device and a light guide may extend between the part of the light source and the cure control means. The light guide may form a light output within the cure control means.

In one embodiment a barrel is arranged in fluid communication with the cartridge outlet and the dispensing nozzle inlet. The barrel thus forms at least part of flow path. The barrel may (at least over a portion) be transparent or translucent for radiation from the energy source, for example light from a light source of the cure control means. Further, the cure control means may be arranged between the outlet of the cartridge and a dispensing opening of the dispensing nozzle. The cure control means may extend over at least a part of the barrel and at least a part of the dispensing nozzle. The dispensing nozzle further may be transparent or translucent for light of the light source of the cure control means. Optionally, the barrel and the dispensing nozzle comprise a static mixing element, or one of the barrel and the dispensing nozzle comprise a static mixing element. Generally, the cure control means is preferably arranged upstream of the dispensing opening. The term "upstream" thereby refers to the direction of the flow of the dental material dispensed from the device.

In a further embodiment the barrel may not be present. In this embodiment the dispensing nozzle inlet may be mated with the cartridge outlet to establish a fluid communication between the cartridge and the dispensing nozzle. The dispensing nozzle may (at least over a portion) be transparent or translucent for radiation from the energy source, for example light from a light source of the cure control means. The cure control means may be arranged between the outlet of the cartridge and a dispensing opening of the dispensing nozzle. The dispensing nozzle may comprise a static mixing element.

In a particular embodiment the cartridge may comprise toward a rear end of the cartridge at least one composition chamber for storing the dental composition. Each composition chamber may be formed by a barrel-shaped portion in which a piston is received or receivable. Further, each composition chamber may at a front end of the cartridge have a cartridge outlet for the composition stored within the respective composition chamber. The piston is preferably sealingly disposed and displaceable within the barrel-shaped portion for urging the dental composition toward the cartridge outlet. The barrel-shaped portion of the composition chamber and the plunger means are preferably configured so that the plunger means can push the piston of the cartridge forward (in a direction toward the outlet). The device may have a barrel which at a rear end of the barrel is connected to or removably attachable to the cartridge front end so that the barrel and the outlet are in fluid communication with each other. Further, an opposite front end of the barrel and the dispensing nozzle preferably are connected to or removably attachable with each other. Thus, the cartridge may be removable from the device in the form of an assembly formed of the cartridge, the barrel and the dispensing nozzle. The barrel may correspond to a mixing barrel as described in further detail below.

In one embodiment the plunger means is assigned to, connected to or formed in one piece with the piston. For example, the plunger means may not be part of the dispensing device. Thus, the plunger means is replaceable together with replacing the cartridge or cartridge assembly. Therefore, contamination of the plunger means due to contact with residual material at walls of the composition chambers can be minimized.

In one embodiment the dental composition is provided in the form of two or more separate components apart from the cartridge or device. In this embodiment the components may be mixed just prior to use and filled in the device or the cartridge. In this embodiment the device or cartridge may have a single chamber.

In one embodiment the dispensing of a coherent strand of dental material is based on a continuous movement of the plunger means. Accordingly a dispensing cycle may start with the start of the movement of the plunger means and end upon the next stop of the plunger means.

In one embodiment the energy source comprises an irradiation source. The irradiation source may be adapted for irradiating the dental composition and/or the dental material with light. The light may essentially be formed of blue and/or UV light.

For the purpose of the present specification the term "blue light" refers to light having a wavelength within the range of about 430 nm to 500 nm, preferably within a range of about 430 nm to 480 nm. Blue light preferably predominantly consists of light within a range of about 430 nm to 480 nm. Further, blue light may particularly not comprise light having a wavelength outside the range of about 430 nm to 480 nm at a substantial intensity or at all. In particular blue light may have a first portion of light within a range of about 430 nm to 480 nm and preferably does not have a significant second light portion within a range of 570 nm and 590 nm, wherein the maximum intensity of the second portion of light is preferably less than 10% and more preferably less than 1% of the maximum intensity of the first portion of light. Further blue light may not have a significant third light portion within the spectrum of visible light outside the range of 430 nm and 480 nm and outside the range of 570 nm to 590 nm, wherein the maximum intensity of any third portion of light is preferably less than 25% and more preferably less than 20% of the maximum intensity of the first portion of light.

For the purpose of the present specification the term "UV light" refers to light having a wavelength within the range of about 315 nm to 379 nm. UV light preferably predominantly consists of light within this range.

In one embodiment the energy source comprises a heat source for heating the dental composition and/or the dental material. The heat source may correspond to a light source which emits light in the visible area (380 nm to 750 nm). Further, the heat source may correspond to a light source which emits light in the visible area and the infrared area (>750 10000 nm, preferably 780 nm to 1000 nm). The heat source may further correspond to a heat element, for example a heating wire, heating tube or heating rod, for example.

In one embodiment the device comprises two plunger means. The plunger means may be arranged within the cartridge and may be replaceable together with replacing the cartridge. Further the device may have a receptacle for receiving a two-component cartridge for storing two different dental compositions from which the dental material can be mixed. One of the plunger means is preferably configured such that it can be moved into one chamber of the cartridge, whereas the other one of the plunger means is preferably configured such that it can be moved into another chamber of the cartridge.

In another embodiment the device has a receptacle for receiving a single-component cartridge for storing the dental composition.

In a further embodiment the device comprises the single-component cartridge or the two-component cartridge. In the embodiment of the two-component cartridge the device may have at least one static mixer. The static mixer has an inlet end which in one example may be fixedly connectable to outlets of the cartridge. The static mixer may further have a dispensing end for releasing the dental material mixed from the two dental compositions. Further, the static mixer may have a static mixing element arranged in a mixing barrel extending between the inlet end and the dispensing end.

In one embodiment the device comprises a mode switch for alternatively activating the first dispensing mode and the second dispensing mode. The first dispensing mode and the second dispensing mode are preferably selectively switchable by user. Further, one mode is preferably switchable while the other mode is activated and vice versa. In particular, the first dispensing mode may be activated while the second dispensing mode is activated and the second dispensing mode may be activated while the first dispensing mode is activated. Activating the first dispensing mode preferably causes the second dispensing mode to deactivate, and activating the second dispensing mode preferably causes the first dispensing mode to deactivate. Switching between the modes preferably does not include the device to be switched off entirely. Either of the first and second dispensing mode may be a default mode in which the device operates upon activation of the device. The device may have a switch for switching the device on (or to activate the device) and upon activation, the device starts in the default mode. The first or second dispensing mode may then be user-activated as desired. This enables the device to be used for preferred dispensation of, for example, dental impression material and optional dispensation of, for example, dental retraction material.

The term "dental impression material" refers to one type of the dental material which is to be used for impressioning. The dental impression material may be chemically identical to the dental material but is distinguished herein by its purpose of use.

The term "dental retraction material" refers to an alternative type of the dental material which is to be used for dental retraction. The dental retraction material has preferably been exposed to energy provided by the energy source of the device. A dental impression material as referred to herein preferably has a lower viscosity and/or is less firm in consistency than a dental retraction material, although both, the dental impression material and the dental retraction material are based on the same dental material.

In a further embodiment the device is configured as handheld device for intra-oral use. Accordingly, the device may be pen-shaped or gun-shaped. Further, the device preferably comprises a motor for moving the plunger means. The device may be battery powered and therefore cordless.

In a further embodiment the cartridge is exchangeable. Thus, an empty cartridge can be replaced by a full cartridge in the device. Further the static mixer and the dispensing nozzle may be replaceably attachable to the cartridge. This enables one cartridge to be used multiple times with a fresh static mixer and dispensing nozzle each time.

In one embodiment the plunger means is a plunger rod which is drivable by a drive for moving the plunger rod. The drive may comprise an electric motor and a transmission for converting a rotation of the motor in a linear movement of the plunger rod. The plunger rod may be replaceable together with replacing the cartridge. The device may comprise a spindle. The spindle may be a component of the cartridge and therefore may also form the plunger rod or may be connected to the plunger rod. Further, the spindle may be a component of the device for moving a plunger rod in the cartridge. The spindle may be driven (rotated) by the motor so that the spindle by screwing action also moves linearly toward the cartridge.

In a further aspect, the invention relates to the device of the invention in combination with a dental material or composition which is characterized by comprising a one-component formulation which includes:
(a) a pre-polymer formed by reacting a polyol or polyester polyol, a diisocyanate and a hydroxyacrylate or methacrylate;
(b) a metal catalyst;
(c) a plasticizer;
(d) a photosensitizer;
(e) a reducing agent; and
(f) a filler.

Other light hardenable dental compositions may be used. Examples for light hardenable impression materials are given in EP 2 380 925 A1 (3M), U.S. Pat. No. 5,145,886 (Oxman et al.), EP 0 398 701 B1 (3M), U.S. Pat. No. 6,376,569 B1 (Oxman et al.), EP 0 269 071 B1 (Dentsply). The content with respect to the chemical formulations of the compositions disclosed in these documents is herewith incorporated by reference.

Upon application of radiation, the radiation-sensitive composition will start to cure, which typically goes along with an increase of consistency. Such a curing or pre-polymerization takes place before the material made from this composition is inserted into the sulcus of a tooth.

Besides a radiation-sensitive curing mechanism, the composition may contain in addition a dark-curing mechanism, e.g. based on a redox-initiator system.

The composition may also be cured by using a Lewis or Broensted acid containing initiator. These initiators are typically used for initiating or starting the curing or hardening reaction of dental impression material curing via the ring-opening of aziridino moieties.

In still a further aspect the invention relates to a method of dispensing a dental material prepared from a dental composition. The method comprises the steps of:
providing a device for dispensing the dental material;
the device having cure control means comprising an energy source and a flow path on which the dental composition and/or the dental material flows past the energy source during dispensation;
using the device for urging the dental composition and/or the dental material toward a dispensing area;
dispensing from the device a coherent strand of dental material in a dispensing cycle; and
within the dispensing cycle: operating the device in a first dispensing mode and additionally in a second dispensing mode;
exposing the dental composition and/or the dental material to a specific energy by control of the energy source and/or by control of the speed of the flow of the dental composition and/or the dental material on the flow path;
wherein the specific energy is quantified by the energy intensity the dental composition and/or the dental material is exposed to relative to the flow speed; and
wherein the ratio between the specific energy in the second dispensing mode and the specific energy in the first dispensing mode is smaller than 1.

In one embodiment the specific energy in the second dispensing mode is essentially zero. Accordingly, in the second dispensing mode the energy source may be switched off or deactivated (although the flow speed of the dental composition and/or the dental material is greater than zero).

The invention relates in a further aspect to a strand of dental material, having a front end and a rear end, a leading portion adjacent the front end, a trailing portion adjacent the rear end and an intermediate portion connecting the leading portion and the trailing portion. Increments 0 to n of the strand along the strand's length have different ages $T_0$ to $T_n$ since dispensation, with $T_0$ forming the age at the rear end and $T_n$ forming the age at the front end. Over the range of the strand's increments i=0 to n each increment has an individual remaining setting time $Set_i$. There is an essentially constant common first base setting time $BSet1=Set_i+T_i$ over a range of increments i=m to n and an essentially constant common different second base setting time $BSet2=Set_i+T_i$ over a range of increments i=0 to k. The first base setting time BSet1 may be shorter than the second base setting time BSet2. In an application of the strand for combined dental retraction and dental impressioning, thus, increments of the leading portion may harden earlier and preferably have a stiffer consistency, than increments of the trailing portion. Accordingly the leading portion may be used for insertion into the sulcus for dental retraction, whereas the second portion may be used for applying over the tooth for dental impressioning. The skilled person will recognize that alternatively the strand may be prepared with the first base setting time BSet1 being longer than the second base setting time BSet2, although this is not preferred in the combined dental retraction and dental impressioning procedure described above.

Preferably k, m and n are greater than 0 (zero). Further, k, n and m are different from each other with 0<k<m<n. Typically, in the intermediate portion which is formed of increments k to m there is a non-constant base setting time. The non-constant base setting time changes between BSet1 and BSet2.

In a further aspect the invention relates to a use of such a dental material strand as defined herein for combined dental retraction and dental impressioning.

The first dispensing mode is preferably a dental retraction material dispensing mode, meaning a mode in which the device dispenses a dental retraction material. Further, the second dispensing mode is preferably a dental impression material dispensing mode, meaning a mode in which the device dispenses a dental impression material.

BRIEF DESCRIPTION OF THE FIGURES

FIG. 1 is a perspective view of a device according to an embodiment of the invention;

FIG. 2 is a perspective view of a device according to a further embodiment of the invention.

DETAILED DESCRIPTION OF THE INVENTION

Figure 3:
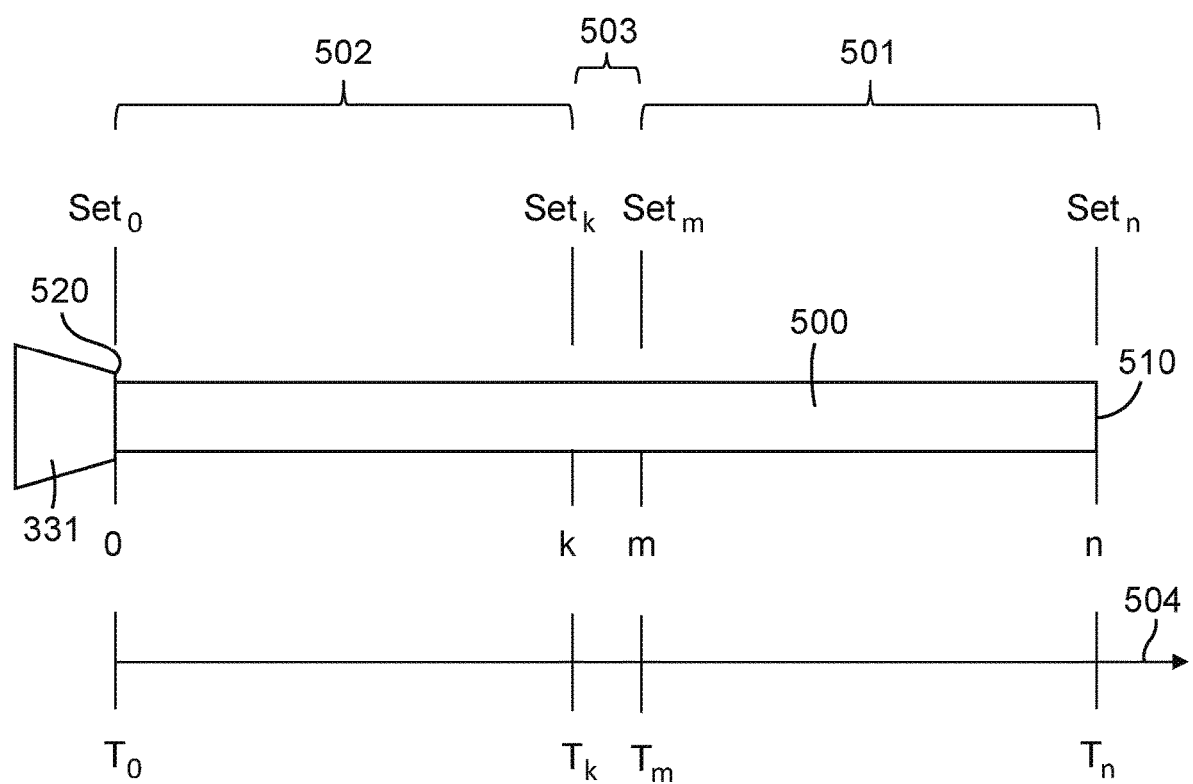
FIG. 3 is a schematic illustration of a strand of dental material according to an embodiment of the invention.

FIG. 1 shows a dental material dispensing device 1 according to the invention. The device 1 has a body 11 having a rear end 112 and a front end 113. A portion of the body 11 forms a grip portion 114 by which the device 1 can be held and operated by a user. In the example the device 1 is elongated, in particular essentially cylindrical, so that the grip portion 114 is formed by a portion of the elongated body 11. However, in another example the device may be gun-shaped so that the grip portion may be formed by a handle which protrudes laterally from an elongated body portion.

The device 1 has a receptacle 115 for receiving a cartridge 13 therein. In the example the receptacle 115 is formed by the body 11. The cartridge 13 has (attached thereto) a dispensing nozzle 131 for dispensing dental material and a transparent or light-transmissive barrel 132 arranged between a composition chamber 133 of the cartridge 13 and the dispensing nozzle 131. The cartridge 13 in the example stores a light-hardenable dental composition, in particular a dental composition which can be hardened by irradiation with blue light. Further, the device 1 has a plunger means 12 (indicated as dashed lines) which is arranged such that it can be moved into the receptacle 115 for extruding the light-hardenable dental composition from the cartridge 13. The plunger means 12 is movable by control of the device 1. In another example the plunger means is not part of the device but may be a component which is separate from the device. Optionally the plunger means may be separate from the device and the cartridge. In such an example the device may have a thrust member which is movable by control of the device for moving the plunger means. In particular the plunger means 12 may be movable by control of an electrically powered motor (not shown) of the device 1. The motor may be arranged, for example, for driving a rotatable hollow inwardly threaded spindle in which the plunger means is threadably received. In this embodiment the plunger means is locked against rotation so that a rotation of the spindle causes the plunger means to axially (in the dimension of the rotation axis of the spindle) move. The skilled person will recognize that alternatively the plunger means may have a hollow threaded structure and the spindle may be threadably received in the hollow threaded structure of the plunger means. Other drives mechanisms than threaded connections as described are possible for moving the plunger means, for example a chain drive, or a hydraulic or pneumatic drive, as appropriate. Corresponding arrangements and functions may be provided for the embodiment having a thrust member instead of a plunger means of the device.

The plunger means 12 is movable for urging the dental composition or the dental material toward a dispensing area 14 of the device 1. In the example, the dispensing area 14 has cure control means 15 comprising an energy source in the form of a light source 151. The light source 151 of the example comprises an LED, preferably one or more high power LEDs. The LEDs may be arranged circumferentially around the barrel 132. Alternatively the LED or LEDs may be arranged in the grip portion 114 and a light guide or light guides (not shown) may extend between the LED(s) and the barrel. The light guide(s) in this case may have light outputs that are arranged circumferentially around the barrel 132. The skilled person will recognize that the barrel 132 may extend over a certain length and the light source 151 may only extend over a part of that length. The barrel 132 is arranged for receiving light emitted from the light source 151. In particular, any dental composition present in the barrel 132 can be irradiated by the light emitted from the light source 151. Thereby the dental composition can be for example partially hardened so that consequently the consistency and/or the viscosity changes.

The device 1 is further configured such that it can be operated in a first and a second dispensing mode which in the examples are further referred to as a dental retraction material dispensing mode and in a dental impression material dispensing mode, respectively. Therefore the device has an activation switch 16 and a mode switch 17. The activation switch 16 allows the device to be switched on for dispensing the dental material, and the mode switch 17 allows to switch between the dental retraction material dispensing mode and the dental impression material dispensing mode. Other configurations of the switches are possible, for example the two switches may each be used for activating the device in the respective dental retraction material dispensing mode and the dental impression material dispensing mode.

In the dental retraction material dispensing mode the device 1 activates the cure control means 15 (in the example the light source 151) to energize the dental composition as it flows through the barrel 132. The degree of energizing may be set by controlling the energy intensity (or light intensity) emitted from the cure control means 15 and/or the flow rate of the dental composition at a determined relationship relative to each other. Optionally the device 1 may have an adjusting button for adjusting the relationship between the energy intensity (or light intensity) and/or the flow rate. In the dental retraction material dispensing mode the device 1 may therefore be used to dispense the dental material in the form of a relatively high viscos or firm dental retraction material. Such a dental retraction material may for example exhibit properties similar to a dental retraction cord, for example, may be suitable to be pushed into a patient's sulcus by help of a dental instrument and may be generally removable by pulling the paste.

In the dental impression material dispensing mode the device 1 dispenses the dental material with the cure control means 15 being deactivated or activated at a lower magnitude of the energy (for example at a lower light intensity). Alternatively or additionally in the dental impression material dispensing mode the flow rate of the dental composition and/or the dental material as it flows past the energy flow may be increased relative to the dental retraction material dispensing mode. Accordingly, the dental composition is not energized or energized at a reduced magnitude by the cure control means 15 during dispensation of the dental material. The dental material may for example have a viscosity and consistency of a dental impression material. Such a dental impression material may be flowable and may easily adapt itself to the shape of an object to which it is applied. Once the dental impression material is applied to the object, for example a patient's tooth, the dental impression material may harden or may be caused to harden or to harden faster by energy, for example by blue light.

The device 1 is preferably configured to dispense a single strand of material with at least one portion formed of the dental retraction material and at least one further portion formed of the dental impression material. This means that during one dispensing cycle both types of material can be dispensed in a single coherent strand from the device.

FIG. 2 shows a further embodiment of a device 2 according to the invention. The device 2 in general has the same features as described for the example shown in FIG. 1 except for the following modifications. The reference numbers of the features of the device 2 correspond to the reference numbers of the same features of the device 1 of FIG. 1 with the leading "1" replaced by "2".

The device 2 has a receptacle 215 for receiving a cartridge 23 therein. The cartridge 23 of this example has a first composition chamber 233a and a second composition chamber 233b, each of which containing a dental composition for the dental material. The dental material can be formed by mixing the two dental compositions with each other. The two dental compositions of this example may be configured so that the dental material mixed therefrom starts hardening by chemical reaction as soon as the dental compositions are mixed. Typically the dental compositions for the dental material are configured so that a chemical reaction at room temperature progresses over a pre-determined approximate working time after mixing. Such a working time may be between about 30 seconds to about 5 minutes, in particular between about 30 seconds and 2 minutes. This enables accurate positioning of the dispensed dental material and relatively rapid hardening after. Accordingly, the dental material may be dispensed from the device 2 in the dental impression material dispensing mode without exposing the dental material to additional energy from cure control means 25 of the device 2. Further, in case the dental material is dispensed from the device 2 in the dental retraction material dispensing mode the dental composition and/or the material is exposed to energy from the cure control means 25. In the example the dental material may be a so-called dual-hardenable material, that for example may contain a photo initiator system, which causes polymerization of the composition to be initiated if exposed to light (in particular blue light), in addition to the chemical reaction of the mixed dental compositions. However, the dental material may in another case not comprise an additional photo initiator system, but may just be hardenable by mixing of the components. Such a dental material may for example be a commercially available dental impression material, like one exemplary type is available under the designation 3M™ ESPE™ Impregum™ Garant™ Soft Light Body from the company 3M Deutschland GmbH. In both cases, if a dental material with or without a photo initiator is used, the exposure to energy, for example light, typically causes the material to harden more rapidly, in case of the dental material with photo initiator due to additional polymerization and in case of the dental material without a photo initiator due to an increase of temperature. In the latter case the increase of the temperature typically causes the normal chemical reaction to progress more rapidly. Thus, the dental material (in this case the dental retraction material) can be dispensed from the device 2 at a higher viscosity and/or a more firm consistency relative to the dental material dispensed in the dental impression material dispensing mode. It is noted that instead of a dual-hardenable material a two-component light-hardenable composition which is hardenable essentially only by light may be used. Such a two-component (or more component) composition may be stored as separate components, for example to maximize the shelf life. Mixing of such two-components typically does not cause the two-components to quickly chemically react with each other, and the hardening is initiated by light.

The cartridge 23 has a transparent or light-transmissive barrel 232 arranged between the composition chambers 233a, 233b of the cartridge 23 and a dispensing nozzle 231. The barrel 232 is in fluid communication with an outlet of each of the composition chambers 233a, 233b. In the example the barrel 232 further comprises a static mixing element which causes the components to mix as they flow through the barrel 232 from the composition chambers 233a, 233b toward the dispensing nozzle 231. Further, the barrel 232 is in fluid communication with the dispensing nozzle. The dispensing nozzle may additionally or alternatively comprise a static mixing element for mixing the components. The barrel 232 and the static mixing element in combination form a static mixer.

The device 2 of this example further has a first and a second plunger means 22a, 22b (indicated as dashed lines). The plunger means 22a, 22b are arranged such that they can be moved into the receptacle 215 for extruding the dental compositions for the dental material from the cartridge 23. The plunger means 22a, 22b are (preferably synchronously) movable by control of the device 2 as described for the example in FIG. 1. Alternatively, the plunder means may be replaceable with replacing the cartridge. For example the plunger means may not be part of the device as described in the example in FIG. 1. In this case the device may have one common or several thrust members for all or each plunger means.

The device of the example is battery powered. Therefore the device is a cordless device. The battery may be rechargeable or exchangeable. In another example the device is connectable to a normal power line or to the power line of a dental chair, for example to an electric, pneumatic, hydraulic power line, or to a mechanical drive of a dental chair (for example a drive as used to drive a dental burr).

FIG. 3 shows a strand 500 of dental material as it is dispensed from a dispensing nozzle 331. The strand 500 has a leading portion 501, a trailing portion 502 and an intermediate portion 503. The intermediate portion 503 is formed of dental material which is dispensed after switching from the first to the second dispensing mode and lasts for a time until the second dispensing mode runs at a steady state. This is to account for any time the energy source requires to deactivate or to reduce the emission of energy and to account for any material specific adjustment to the changed interaction with the energy source. Typically, a time period at which the strand is dispensed as intermediate portion may be below 2 seconds. For the sake of completeness it is noted that one or more further intermediate portions may be provided by switching from the second to the first dispensing mode or vice versa.

The leading portion 501 forms a front end 510 of the strand, and the trailing portion 502 forms a rear end 520 of the strand. The rear end 520 designates a position of the strand 500 which just exits the dispensing nozzle 331. Accordingly, the rear end may not necessarily form a free end, for example one which is cut off, but preferably refers to a position at a certain time of dispensation. The illustration represents a snapshot of the strand 500 while it is dispensed from the dispensing nozzle 331. At the time of the snapshot the rear end since dispensation has an age of 0 (zero) whereas the age of the front end since dispensation is greater than 0. At this time the strand preferably does not contain any fully hardened material. The strand 500 is virtually divided into mathematical increments 0 to n. The increment 0 forms the rear end and the increment n forms the front end. Corresponding ages $T_0$ to $T_n$ of the increments are represented by the time bar 504, with $T_0$ designating the age of increment 0 and $T_n$ designating the age of increment n. If a dental material is used which hardens over time each increment has a remaining setting time until which the material will essentially harden. Due to the fact that the increments have different ages, the setting time of the individual increments varies along the strand in this case. For example, if the dental material has a predetermined setting time after it is dispensed the remaining setting time will be shorter for an "older" increment (one that is positioned further toward the front end) than for a "younger" increment (one that is positioned further toward the rear end).

In the example, the leading portion 501 was dispensed in the first dispensing mode, and the trailing portion 502 has been dispensed in the second dispensing mode (although the skilled person will recognize that the dispensation may likewise be performed in a reverse order). The increment n has a (remaining) setting time $Set_n$ and the increment m has a (remaining) setting time $Set_m$. Because the increment n was dispensed earlier, part of the base setting time has been lapsed with respect to the setting time at the time $T_0$. To compare the setting times of different increments over the strand therefore a base setting time is calculated which accounts for the age of each individual setting time. The base setting time is calculated by the remaining setting time plus the age since dispensation. In a strand according to the prior art the base setting time is constant over the whole strand. According to the present invention, however, the leading portion 501 and the trailing portion 502 have different base setting times. This is, because the leading portion 501 and the trailing portion 502 were dispensed at different first and second dispensing modes, respectively. In particular, the first base setting time is designated as BSet1 and the second base setting time is designated as BSet2. BSet1 is calculated from $Set_i+T_i$ for increments i=m to n and BSet2 is calculated from $Set_i+T_i$ for increments i=0 to k. For explanation only it is in one example assumed that the strand 500 has been dispensed for 12 seconds, 5 seconds for the leading portion 501, 2 seconds for the intermediate portion 503 and 5 seconds for the trailing portion 502. The first base setting time BSet1 for material dispensed at the first dispensing mode is assumed to be 20 seconds, and the second base setting time BSet2 for material dispensed at the second dispensing mode is assumed to be 60 seconds. Increment n has an age of 12 seconds and accordingly a remaining setting time $Set_n$ of 8 seconds. Increment m has an age of 7 seconds and accordingly a remaining setting time $Set_m$ of 13 seconds. $BSet1=Set_n+T_n=8$ seconds+12 seconds=20 seconds=$Set_m+T_m=13$ seconds plus 7 seconds=20 seconds. $BSet2=Set_0+T_0=60$ seconds+0 seconds=60 seconds=$Set_k+T_k=55$ seconds+5 seconds=60 seconds.

The invention claimed is:

1. A method of dispensing a dental material prepared from a dental composition, comprising the steps of:
   providing a device for dispensing the dental material, the device including a receptacle for receiving the dental composition;
   the device having cure control comprising a light source and an internal flow path on which the dental composition and/or the dental material flows past the light emitted from the source during dispensation;
   using the device for urging the dental composition and/or the dental material toward a dispensing opening, the flow path disposed upstream from the opening;
   dispensing from the device a coherent strand of dental material in a dispensing cycle; and
   within the dispensing cycle: operating the device in a first dispensing mode in which the device dispenses a dental retraction material and additionally in a second dispensing mode in which the device dispenses a flowable dental impression material;
   exposing the dental composition and/or the dental material to a specific energy by control of the light source and/or by control of the speed of the flow of the dental composition and/or the dental material on the flow path;
   wherein the specific energy is quantified by the energy intensity the dental composition and/or the dental material is exposed to relative to the flow speed; and
   wherein the ratio between the specific energy in the second dispensing mode and the specific energy in the first dispensing mode is smaller than 1.

2. The method of claim 1, wherein the specific energy in the second dispensing mode is essentially zero.

3. The method of claim 1, wherein the light emitted by the light source is essentially formed of blue and/or UV light.

4. The method of claim 1, the device further comprising two plungers and the receptacle is configured to hold a two-component cartridge for two dental compositions from which the dental material can be mixed.

5. The method of claim 4, the device comprising the two-component cartridge and at least one static mixer, the static mixer having an inlet end which is fixedly connectable to outlets of the cartridge, a dispensing end for releasing dental material mixed from the two dental compositions and a static mixing element arranged in mixing a barrel extending between the inlet end and the dispensing end.

6. The method of claim 1, the device further comprising a mode switch for alternatively activating the first dispensing mode and the second dispensing mode.

7. The method of claim 6, wherein the second dispensing mode is a default mode in which the device operates upon activation of the device and wherein the first dispensing mode is user-activated.

8. The method of claim 1, wherein the device is configured as a handheld device for intra-oral use.

9. The method claim 1, the dental composition comprising:
   a pre-polymer formed by reacting a polyol or polyester polyol, a diisocyanate and a hydroxyacrylate or methacrylate;
   a metal catalyst;
   a plasticizer;
   a photosensitizer;
   a reducing agent; and
   a filler.

10. The method of claim 1, wherein the device includes a barrel disposed between the receptacle and the dispensing opening, and wherein the dental composition and/or dental material flows past the light emitted from the light source while flowing through the barrel.

11. The method of claim 10, wherein the device includes a dispensing nozzle that includes the dispensing opening, and wherein the barrel is coupled to the dispensing nozzle.

12. The method of claim 1, wherein the coherent strand includes a first portion and a second portion, and wherein the first portion is formed of the dental retraction material and the second portion is formed of the dental impression material.

13. The method of claim 1, wherein the receptacle is configured to receive a cartridge containing a dental composition.

14. The method of claim 13, wherein the cartridge includes at least two of a reservoir containing the dental composition, a barrel, and a dispensing nozzle.

15. The method of claim 14, wherein the cartridge includes a reservoir containing the dental composition, a barrel, and a dispensing nozzle.

16. A dental material dispensing device that dispenses a contiguous strand of a dental material, the device comprising:
   a first plunger for dispensing a light-hardenable dental composition from a receptacle along a flow path toward a dispensing opening;

a cure control element comprising a light source positioned within the device such that the dental composition flows past light emitted from the light source during dispensation along the flow path and is exposed to a specific energy by control of the light source and/or by control of the flow speed of the dental composition on the flow path, wherein the specific energy is quantified by the light intensity to which the dental composition is exposed relative to the flow speed of the dental composition; and wherein the cure control element is configured to provide both a first dispensing mode and a second dispensing mode during dispensation of the contiguous strand, and wherein a ratio between the light energy in the second dispensing mode and the light energy in the first dispensing mode is less than 1, and wherein the device is configured to dispense the dental material in the form of a dental retraction material in the first dispensing mode and the device is configured to dispense the dental composition in the form of a dental impression material in the second dispensing mode.

17. The device of claim 16, wherein the device includes a barrel disposed between the receptacle and the dispensing opening, and wherein the dental composition and/or dental material flows past the light emitted from the light source while flowing through the barrel.

18. The device of claim 17, wherein the device includes a dispensing nozzle that includes the dispensing opening, and wherein the barrel is coupled to the dispensing nozzle.

19. The device of claim 16, wherein the receptacle is configured to receive a cartridge containing a dental composition, and wherein the cartridge includes at least two of a reservoir containing the dental composition, a barrel, and a dispensing nozzle.

20. The device of claim 16, wherein the device further comprising a second plunger and the receptacle is configured to hold a two-component cartridge for two dental compositions from which the dental material can be mixed and at least one static mixer, the static mixer having an inlet end which is fixedly connectable to outlets of the cartridge, a dispensing end for releasing dental material mixed from the two dental compositions and a static mixing element arranged in mixing a barrel extending between the inlet end and the dispensing end.

* * * * *